United States Patent
Liao et al.

(10) Patent No.: US 12,351,666 B2
(45) Date of Patent: Jul. 8, 2025

(54) MANUFACTURING METHOD OF POLYMER MATERIAL

(71) Applicant: NAN YA PLASTICS CORPORATION, Taipei (TW)

(72) Inventors: Te-Chao Liao, Taipei (TW); Ching-Yao Yuan, Taipei (TW); Wei Tang Liao, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 337 days.

(21) Appl. No.: 17/947,183

(22) Filed: Sep. 19, 2022

(65) Prior Publication Data
US 2024/0052082 A1  Feb. 15, 2024

(30) Foreign Application Priority Data
Aug. 12, 2022  (TW) .................................. 111130471

(51) Int. Cl.
C08F 283/02 (2006.01)
C08J 9/00 (2006.01)

(52) U.S. Cl.
CPC .......... C08F 283/02 (2013.01); C08J 9/0061 (2013.01); C08J 2203/08 (2013.01); C08J 2367/08 (2013.01)

(58) Field of Classification Search
CPC ... C08J 2367/08; C08F 283/02; C08G 63/672
See application file for complete search history.

(56) References Cited

U.S. PATENT DOCUMENTS

| | | | |
|---|---|---|---|
| 2015/0284508 A1* | 10/2015 | Ou | C08G 63/914 525/437 |
| 2017/0008826 A1* | 1/2017 | Essaddam | C07C 29/095 |
| 2017/0349744 A1* | 12/2017 | Chang | C08L 67/025 |
| 2022/0348715 A1* | 11/2022 | Peters | C08G 63/85 |
| 2023/0014630 A1* | 1/2023 | Lin | C07C 69/82 |
| 2023/0416183 A1* | 12/2023 | Bhaumik | C08J 11/24 |
| 2024/0246897 A1* | 7/2024 | Cecchetto | B01J 31/04 |
| 2024/0287280 A1* | 8/2024 | Fufachev | C07C 69/76 |
| 2024/0409488 A1* | 12/2024 | Zheng | C07C 29/80 |
| 2025/0002676 A1* | 1/2025 | Barnicki | C08J 11/24 |

(Continued)

FOREIGN PATENT DOCUMENTS

| | | | |
|---|---|---|---|
| CN | 107739434 A * | 2/2018 | ......... C08G 63/6926 |
| CN | 110078905 | 8/2019 | |

(Continued)

OTHER PUBLICATIONS

CN-107739434-A English Machine Translation (Year: 2018).*
"Office Action of Taiwan Counterpart Application", issued on Feb. 23, 2023, p. 1-p. 8.

Primary Examiner — Robert S Loewe
(74) Attorney, Agent, or Firm — JCIPRNET

(57) ABSTRACT

A manufacturing method of a polymer material at least includes the following steps. A raw material including polyethylene terephthalate is provided. An alcoholysis reaction is performed by using the raw material with aliphatic diols to form an intermediate product, wherein the intermediate product includes bis 2-hydroxyethyl terephthalate. A polymerization reaction is performed by using the intermediate product and polytetramethylene ether glycol to form a thermoplastic polyester elastomer.

15 Claims, 1 Drawing Sheet

(56) References Cited

U.S. PATENT DOCUMENTS

2025/0043097 A1 * 2/2025 Zargana .................. C07C 37/84
2025/0075054 A1 * 3/2025 Ekart ....................... C08J 11/24

FOREIGN PATENT DOCUMENTS

| TW | 201538561 | 10/2015 | |
|---|---|---|---|
| TW | 201809062 | 3/2018 | |
| WO | WO-2016123558 A1 * | 8/2016 | ............. B29B 17/02 |

* cited by examiner

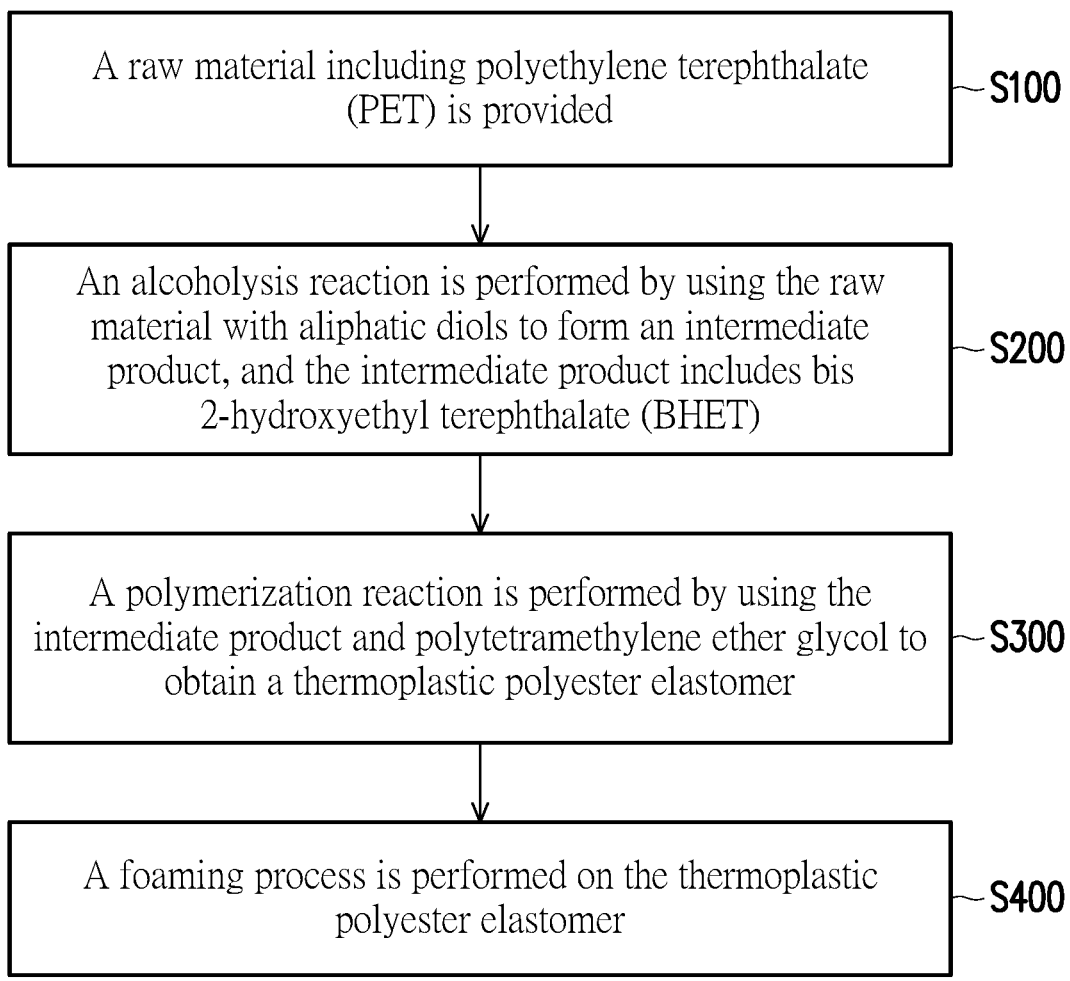

MANUFACTURING METHOD OF POLYMER MATERIAL

CROSS-REFERENCE TO RELATED APPLICATION

This application claims the priority benefit of Taiwan application serial no. 111130471, filed on Aug. 12, 2022. The entirety of the above-mentioned patent application is hereby incorporated by reference herein and made a part of this specification.

BACKGROUND

Technical Field

The present disclosure relates to a method for manufacturing a polymer material.

Description of Related Art

The current manufacturing method of thermoplastic polyester elastomer (TPEE) normally involves manufacture through transesterification reaction (esterification reaction), and the aforementioned reaction often involves the production of toxic and hazard by-products, such as tetrahydrofuran (THF). Therefore, the current manufacturing methods of thermoplastic polyester elastomers are not environmentally friendly.

SUMMARY

The present disclosure provides a manufacturing method of a polymer material, which may effectively achieve environmental protection.

In the disclosure, a manufacturing method of a polymer material at least includes the following steps. A raw material including polyethylene terephthalate (PET) is provided. An alcoholysis reaction is performed by using the raw material with aliphatic diols to form an intermediate product, and the intermediate product includes bis 2-hydroxyethyl terephthalate (BHET). A polymerization reaction is performed by using the intermediate product and polytetramethylene ether glycol to form a thermoplastic polyester elastomer.

In an embodiment of the present disclosure, the manufacturing method of the polymer material further includes performing a foaming process on the thermoplastic polyester elastomer.

In an embodiment of the present disclosure, in the alcoholysis reaction, the weight ratio of PET and aliphatic diols is between 1:0.5 and 1:3.

In an embodiment of the present disclosure, the proportion of the BHET in the thermoplastic polyester elastomer is between 30 wt % and 80 wt %.

In an embodiment of the present disclosure, the proportion of the polytetramethylene ether glycol in the thermoplastic polyester elastomer is between 20 wt % and 70 wt %.

In an embodiment of the present disclosure, the aliphatic diols include ethylene glycol, 1,3-propanediol, 1,4-butanediol or a combination thereof.

In an embodiment of the present disclosure, antioxidant is adopted in both alcoholysis reaction and polymerization reaction.

In an embodiment of the present disclosure, the antioxidant is added in an amount ranging from 100 ppm to 5000 ppm.

In an embodiment of the present disclosure, an alcoholysis catalyst is used in the alcoholysis reaction, and the alcoholysis catalyst includes a titanium compound, a tin compound, an antimony compound or a combination thereof.

In an embodiment of the present disclosure, a polymerization catalyst is used in the polymerization reaction, and the polymerization catalyst includes a titanium compound, a magnesium compound, a sodium compound, a phosphorus compound, a tin compound, an antimony compound or a combination thereof.

Based on the above, in the thermoplastic polyester elastomer obtained by the method for manufacturing a polymer material of the present disclosure, BHET is a hard segment. Therefore, the thermoplastic polyester elastomer has high heat resistance. Further, the method for manufacturing a polymer material of the present disclosure does not include a transesterification reaction. Therefore, when synthesizing the thermoplastic polyester elastomer, by-product THF is not easily generated, and the manufacturing process may also be simplified. In this way, the manufacturing method of the polymer material of the present disclosure has the advantages of low energy consumption and low carbon emission.

In order to make the above-mentioned features and advantages of the present disclosure more comprehensible, the following embodiments are given and described in detail with the accompanying drawings as follows.

BRIEF DESCRIPTION OF THE DRAWINGS

The FIGURE is a schematic flowchart of a method for manufacturing a polymer material according to an embodiment of the present disclosure.

DESCRIPTION OF THE EMBODIMENTS

In the following detailed description, for purposes of explanation and not limitation, exemplary embodiments disclosing specific details are set forth in order to provide a thorough understanding of the various principles of the disclosure. It will be apparent, however, to one of ordinary skill in the art, having been benefited from this disclosure, that the present disclosure may be practiced in other embodiments that depart from the specific details disclosed herein. Furthermore, descriptions of commonly-known devices, methods, and materials may be omitted so as not to shift the focus from the description of the various principles of the present disclosure.

Ranges may be expressed herein as "about" one particular value to "about" another particular value, which can also be expressed directly as one particular value and/or to another particular value. When expressing the range, another embodiment includes the one particular value and/or to the other particular value. Similarly, when values are expressed as approximations, by use of the antecedent "about," it will be understood that the particular value forms another embodiment. It will be further understood that an endpoint of each range is clearly related or unrelated to the other endpoint.

In this document, non-limiting terms (such as: may, can, for example, or other similar terms) are non-essential or optional implementation, inclusion, addition or presence.

Unless otherwise defined, all terms (including technical and scientific terms) used herein have the same meaning as commonly understood by one of ordinary skill in the art to which this disclosure belongs. It will also be understood that terms (such as those defined in commonly used dictionaries) should be interpreted to have meanings consistent with those in the relevant technical context and should not be interpreted in an idealized or overly formal sense, unless explicitly defined as such.

The FIGURE is a schematic flowchart of a method for manufacturing a polymer material according to an embodiment of the present disclosure. Referring to the FIGURE, in step S100, a raw material including polyethylene terephthalate (PET) is provided. In some embodiments, the raw material is, for example, waste material including PET.

In some embodiments, the method for providing raw materials includes, for example: collecting waste materials (such as PET bottles, industrial leftover material, yarns or the like) containing PET; corresponding classification may be carried out according to the type, color and/or previous purpose of the aforementioned waste material; then, sorted waste materials may be packaged; thereafter, the packaged waste materials may be transported to a waste treatment plant for crushing and screening treatment, but the present disclosure is not limited thereto. Raw materials containing PET may be obtained through other suitable methods.

In step S200, the raw material and the aliphatic diols are subjected to an alcoholysis reaction to form an intermediate product, and the intermediate product includes bis 2-hydroxyethyl terephthalate (BHET). In some embodiments, since the waste material containing PET is adopted in step S100, the intermediate product may be regarded as recycled BHET (rBHET), but the present disclosure is not limited thereto. Here, the intermediate product may be an oligomer.

In some embodiments, aliphatic diols are C2 to C10 aliphatic diols, for example, aliphatic diols include ethylene glycol, 1,3-propanediol, 1,4-butanediol or a combination thereof, but the present disclosure is not limited thereto.

In some embodiments, in the alcoholysis reaction, the weight ratio of PET to aliphatic diols is between 1:0.5 and 1:3 (for example, 1:0.5, 1:1, 1:1.5, 1:2, 1:2.5, 1:3 or any ratio between 1:0.5 and 1:3).

In some embodiments, the temperature for the alcoholysis reaction is between 200° C. and 250° C. (for example, 200° C., 210° C., 220° C., 230° C., 240° C., 250° C. or any temperature between 200° C. and 250° C.).

In some embodiments, the pressure used for the alcoholysis reaction is between 80 kPa and 130 kPa (for example, 80 kPa, 90 kPa, 100 kPa, 110 kPa, 120 kPa, 130 kPa or any pressure between 80 kPa and 130 kPa).

In some embodiments, the time taken for the alcoholysis reaction is between 150 minutes and 270 minutes (for example, 150 minutes, 180 minutes, 210 minutes, 240 minutes, 270 minutes or any time length between 150 minutes and 270 minutes).

In some embodiments, an alcoholysis catalyst is adopted in the alcoholysis reaction, and the alcoholysis catalyst includes a titanium compound, a tin compound, an antimony compound or a combination thereof. For example, the titanium compound is tetrabutyl titanate, titanium oxalate, etc., the tin compound is dibutyltin dilaurate, dioctyltin, tin oxide, etc., and the antimony compound is antimony trioxide, antimony triacetate, etc., but the present disclosure is not limited thereto.

In some embodiments, the alcoholysis catalyst is added in an amount ranging from 50 ppm to 500 ppm (such as 50 ppm, 100 ppm, 150 ppm, 200 ppm, 250 ppm, 300 ppm, 400 ppm, 500 ppm or any amount between 50 ppm and 500 ppm).

Next, in step S300, a polymerization reaction is performed by using the intermediate product and polytetramethylene ether glycol to form a thermoplastic polyester elastomer. Polytetramethylene ether glycol may be used as the soft segment of thermoplastic polyester elastomer.

In some embodiments, the proportion of BHET as the hard segment in the thermoplastic polyester elastomer is between 30 wt % and 80 wt % (for example, 30 wt %, 40 wt %, 50 wt %, 60 wt %, 70 wt %, 80 wt % or any weight ratio between 30 wt % and 80 wt %). Here, bishydroxybutyl terephthalate (BHBT) is not used as an intermediate product as a hard segment.

In some embodiments, the proportion of polytetramethylene ether glycol as the soft segment in the thermoplastic polyester elastomer is between 20 wt % and 70 wt % (for example, 20 wt %, 30 wt %, 40 wt %, 50 wt %, 60 wt %, 70 wt % or any weight ratio between 20 wt % and 70 wt %).

In some embodiments, the temperature used for the polymerization reaction is between 230° C. and 280° C. (for example, 230° C., 240° C., 250° C., 260° C., 270° C., 280° C., or any temperature between 230° C. and 280° C.).

In some embodiments, the pressure adopted for the polymerization reaction is between 0 kPa and 50 kPa (e.g., 0 kPa, 10 kPa, 20 kPa, 30 kPa, 40 kPa, 50 kPa, or any pressure between 0 kPa and 50 kPa).

In some embodiments, the time taken for the polymerization reaction is between 90 minutes and 270 minutes (e.g., 90 minutes, 120 minutes, 150 minutes, 180 minutes, 210 minutes, 240 minutes, 270 minutes, or any time length between 90 minutes and 270 minutes).

In some embodiments, a polymerization catalyst is used in the polymerization reaction, and the polymerization catalyst includes a titanium compound, a magnesium compound, a sodium compound, a phosphorus compound, a tin compound, an antimony compound, or a combination thereof. For example, the titanium compound is tetrabutyl titanate, titanyl acetate, etc., the magnesium compound is magnesium oxide, magnesium oxyacetate, etc., the sodium compound is sodium oxide, sodium oxyacetate, etc., the phosphorus compound is phosphorus oxide, phosphorus oxyacetate, etc., the tin compound is dioctyltin, tin oxide, etc., and the antimony compound is antimony trioxide, antimony triacetate, etc., but the present disclosure is not limited thereto.

In some embodiments, the polymerization catalyst is added in an amount between 50 ppm and 1000 ppm (for example, 50 ppm, 100 ppm, 300 ppm, 500 ppm, 700 ppm, 1000 ppm, or any amount between 50 ppm and 1000 ppm).

In some embodiments, antioxidant is used in both the alcoholysis reaction and the polymerization reaction, so that the color stability of the product may be further maintained.

In some embodiments, the antioxidant includes at least one of the following materials: pentaerythritol tetrakis(3,5-di-tert-butyl-4-hydroxy) phenylpropionate, tris(2,4-di-tert-butyl)phenyl phosphite, and 3-(3,5-Di-tert-butyl-4-hydroxyphenyl)propionic acid n-octadecyl ester, but the present disclosure is not limited thereto.

In some embodiments, the antioxidant is added in an amount between 100 ppm and 5000 ppm (for example, 100 ppm, 300 ppm, 500 ppm, 800 ppm, 1000 ppm, 3000 ppm, 5000 ppm, or any amount between 100 ppm and 5000 ppm).

Based on the above, in the thermoplastic polyester elastomer obtained by the method for manufacturing a polymer material of the present disclosure, BHET is a hard segment. Therefore, the thermoplastic polyester elastomer has high heat resistance. Further, the method for manufacturing a polymer material of the present disclosure does not include a transesterification reaction. Therefore, when synthesizing the thermoplastic polyester elastomer, by-product THF is not easily generated, and the manufacturing process may also be simplified. In this way, the manufacturing method of the polymer material of the present disclosure has the advantages of low energy consumption and low carbon emission. In addition, since one process is reduced from the manufacturing process, the manufacturing method may also have the advantages of low cost, simple manufacturing, and easy industrialized production, but the present disclosure is not limited thereto.

Finally, step S400 is optionally performed to carry out a foaming process on the thermoplastic polyester elastomer. For example, additives such as chain extender, antioxidant, flame retardant, heat stabilizer, etc. are mixed with thermoplastic polyester elastomer, and then a twin screw extruder is used for kneading to obtain foamable masterbatch. The above-mentioned foamable masterbatch is mixed with a supercritical fluid (such as nitrogen, carbon dioxide, etc.) through a supercritical fluid injection machine for injection molding, thereby obtaining a foamed material. The foamed material has excellent characteristics such as light weight, high rigidity, high specific strength, good electrical insulation, and good sound insulation and heat insulation. In some embodiments, the hardness of the foamed material prepared by the present disclosure is Shore 25D to 45D, the density is 0.15 to 0.3 g/cm$^3$, the tensile strength is 5 to 15 kgf/cm$^2$, and the resilience is 60% to 70%. In some embodiments, the foamed material is suitable for use in foam shoes.

Hereinafter, some examples of the manufacturing method of the polymer material of the present disclosure are provided, however, these examples are illustrative, and the present disclosure is not limited to these examples.

Example 1

80 kilograms of PET, 120 kilograms of aliphatic diols (ethylene glycol) and alcoholysis catalyst are used to carry out an alcoholysis reaction to obtain about 80 kilograms of an intermediate product (rBHET). Next, 20 kilograms of polytetramethylene ether glycol, a polymerization catalyst, and an antioxidant are added to carry out a polymerization reaction to obtain about 100 kilograms of thermoplastic polyester elastomer (TPEE). Then, the thermoplastic polyester elastomer was injection-molded with a supercritical injection machine, and the physical properties thereof were tested. In Example 1, the air intake of the supercritical fluid is adjusted (increasing the air intake can reduce the density) through the supercritical fluid injection machine and mixing of the supercritical fluid (such as nitrogen, carbon dioxide, etc.), thereby obtaining foamed materials of different densities.

Example 2

The manufacturing method of the polymer material of Example 2 is similar to the manufacturing method of the polymer material of Example 1, except that the weight of the intermediate product (rBHET) used is 60 kilograms, and the polytetramethylene ether glycol is 40 kilograms. In Example 2, the air intake of the supercritical fluid is adjusted through the supercritical fluid injection machine and mixing of the supercritical fluid (such as nitrogen, carbon dioxide, etc.), thereby obtaining foamed materials of different densities.

Example 3

The manufacturing method of the polymer material of Example 3 is similar to the manufacturing method of the polymer material of Example 1, except that the weight of the intermediate product (rBHET) used is 40 kilograms, and the polytetramethylene ether glycol is 60 kilograms. In Example 3, the air intake of the supercritical fluid is adjusted through the supercritical fluid injection machine and mixing of the supercritical fluid (such as nitrogen, carbon dioxide, etc.), thereby obtaining foamed materials of different densities.

Comparative Example 1

The terephthalic acid (PTA) and 1,4 butanediol (1,4BG) are subjected to polymerization reaction and transesterification reaction to obtain bis(2-hydroxybutyl) terephthalate (BHBT) as the intermediate product. 80 kg of the intermediate product (BHBT) was polymerized with 20 kg of long-chain polytetramethylene ether glycol to obtain about 100 kg of thermoplastic polyester elastomer (TPEE). Then, the thermoplastic polyester elastomer was injection-molded with a supercritical injection machine, and the physical properties thereof were tested. In Comparative Example 1, the air intake of the supercritical fluid is adjusted through the supercritical fluid injection machine and mixing of the supercritical fluid (such as nitrogen, carbon dioxide, etc.), thereby obtaining foamed materials of different densities.

Table 1 shows the physical property test results of Examples 1 to 3 and Comparative Example 1. Table 1 shows that the foamed materials made of the thermoplastic polyester elastomers of Examples 1 to 3 have comparable or better physical properties as compared with the foamed material made of the thermoplastic polyester elastomer of Comparative Example 1. Therefore, the embodiment of the present disclosure can not only produce a foamed material with excellent performance, but also have the advantages of reducing process steps (without using transesterification), reducing energy consumption and carbon emissions, so as to effectively achieve environmental protection.

TABLE 1

| Composition (wt %) | Examples | | | | | | Comparative Example | |
|---|---|---|---|---|---|---|---|---|
| | 1 | | 2 | | 3 | | 1 | |
| rBHET(hard segment) | 80% | | 60% | | 40% | | — | |
| BHBT(hard segment) | — | | — | | — | | 80% | |
| Polyglycol (soft segment) | 20% | | 40% | | 60% | | 20% | |
| Applied to the subsequent supercritical injection foaming process | | | | | | | | |
| Density (g/cm$^3$) | 0.25 | 0.15 | 0.25 | 0.15 | 0.25 | 0.15 | 0.25 | 0.15 |
| Tensile strength (kgf/cm$^2$) | 14.8 | 13.2 | 13.3 | 11.6 | 8.8 | 7.1 | 12.1 | 10.8 |

TABLE 1-continued

| Composition (wt %) | Examples | | | | | | Comparative Example | |
|---|---|---|---|---|---|---|---|---|
| | 1 | | 2 | | 3 | | 1 | |
| Tear strength (kgf/cm) | 18.5 | 17.7 | 15.6 | 13.2 | 8.3 | 6.6 | 16.5 | 13.7 |
| Bounce rate (%) | 58 | 60 | 63 | 64 | 64 | 63 | 61 | 62 |
| Permanent compression deformation (%) | 22 | 25 | 28 | 26 | 27 | 28 | 31 | 35 |
| Heat shrink 0 min (70° C., 30 min | 0 | 0 | 0 | 0 | 0 | 0 | 0 | 0 |
| 40 min) | 0 | 0 | 0 | 0 | 0 | 0 | 1 | 1.3 |

Although the present disclosure has been disclosed in the above embodiments, it is not intended to limit the present disclosure, and those skilled in the art can make some modifications and refinements without departing from the spirit and scope of the disclosure. Therefore, the scope to be protected by the present disclosure is subject to the scope defined by the appended claims.

What is claimed is:

1. A manufacturing method of a foamed polymer material, comprising:
   providing a raw material comprising polyethylene terephthalate (PET);
   performing an alcoholysis reaction by reacting the raw material with aliphatic diols to form an intermediate product, wherein the intermediate product comprises bis 2-hydroxyethyl terephthalate (BHET), and the alcoholysis reaction does not include a transesterification reaction;
   performing a polymerization reaction of the intermediate product and polytetramethylene ether glycol to obtain a thermoplastic polyester elastomer,
   mixing additives with the thermoplastic polyester elastomer to obtain a foamable masterbatch, and
   mixing the foamable masterbatch with a supercritical fluid through a supercritical fluid injection machine for injection molding to obtain the foamed polymer material,
   wherein an antioxidant is present in both of the alcoholysis reaction and the polymerization reaction,
   wherein a proportion of polymer repeating units derived from the BHET in the thermoplastic polyester elastomer is between 30 wt % and 80 wt %,
   wherein a proportion of polymer repeating units derived from the polytetramethylene ether glycol in the thermoplastic polyester elastomer is between 20 wt % and 70 wt %.

2. The manufacturing method of the foamed polymer material of claim 1, wherein in the alcoholysis reaction, a weight ratio of the PET and the aliphatic diols is between 1:0.5 and 1:3.

3. The manufacturing method of the foamed polymer material of claim 1, wherein the aliphatic diols comprise ethylene glycol.

4. The manufacturing method of the foamed polymer material of claim 1, wherein the antioxidant is added in an amount ranging from 100 ppm to 5000 ppm.

5. The manufacturing method of the foamed polymer material of claim 1, wherein an alcoholysis catalyst is used in the alcoholysis reaction, and the alcoholysis catalyst comprises a titanium compound.

6. The manufacturing method of the foamed polymer material of claim 1, wherein a polymerization catalyst is used in the polymerization reaction, and the polymerization catalyst comprises a titanium compound.

7. The manufacturing method of the foamed polymer material of claim 1, wherein the aliphatic diols comprise 1,3-propanediol.

8. The manufacturing method of the foamed polymer material of claim 1, wherein the aliphatic diols comprise 1,4-butanediol.

9. The manufacturing method of the foamed polymer material of claim 1, wherein an alcoholysis catalyst is used in the alcoholysis reaction, and the alcoholysis catalyst comprises a tin compound.

10. The manufacturing method of the foamed polymer material of claim 1, wherein an alcoholysis catalyst is used in the alcoholysis reaction, and the alcoholysis catalyst comprises an antimony compound.

11. The manufacturing method of the foamed polymer material of claim 1, wherein a polymerization catalyst is used in the polymerization reaction, and the polymerization catalyst comprises a magnesium compound.

12. The manufacturing method of the foamed polymer material of claim 1, wherein a polymerization catalyst is used in the polymerization reaction, and the polymerization catalyst comprises a sodium compound.

13. The manufacturing method of the foamed polymer material of claim 1, wherein a polymerization catalyst is used in the polymerization reaction, and the polymerization catalyst comprises a phosphorus compound.

14. The manufacturing method of the foamed polymer material of claim 1, wherein a polymerization catalyst is used in the polymerization reaction, and the polymerization catalyst comprises a tin compound.

15. The manufacturing method of the foamed polymer material of claim 1, wherein a polymerization catalyst is used in the polymerization reaction, and the polymerization catalyst comprises an antimony compound.

* * * * *